US012795526B2

(12) United States Patent
Krishnamoorthi et al.

(10) Patent No.: US 12,795,526 B2
(45) Date of Patent: Nov. 10, 2026

(54) HETEROGENEOUS SLICE DEPLOYMENT WITHIN A REGISTRATION AREA OF A CELLULAR COMMUNICATIONS NETWORK

(71) Applicant: Telefonaktiebolaget LM Ericsson (publ), Stockholm (SE)

(72) Inventors: Vengatanathan Krishnamoorthi, Linköping (SE); Thomas Walldeen, Linköping (SE); Waikwok Kwong, Solna (SE); Angelo Centonza, Granada (ES); Alexander Vesely, Feldbach (AT); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 404 days.

(21) Appl. No.: 18/272,635

(22) PCT Filed: Jan. 20, 2022

(86) PCT No.: PCT/IB2022/050486
§ 371 (c)(1),
(2) Date: Jul. 17, 2023

(87) PCT Pub. No.: WO2022/157666
PCT Pub. Date: Jul. 28, 2022

(65) Prior Publication Data

US 2025/0081093 A1 Mar. 6, 2025

Related U.S. Application Data

(60) Provisional application No. 63/140,135, filed on Jan. 21, 2021.

(51) Int. Cl.
*H04W 48/18* (2009.01)
*H04W 48/16* (2009.01)
*H04W 60/04* (2009.01)

(52) U.S. Cl.
CPC .......... *H04W 48/18* (2013.01); *H04W 48/16* (2013.01); *H04W 60/04* (2013.01)

(58) Field of Classification Search
CPC .............................. H04W 48/14; H04W 60/04
(Continued)

(56) References Cited

U.S. PATENT DOCUMENTS

2018/0368061 A1 12/2018 Yu et al.
2019/0141606 A1* 5/2019 Qiao .................... H04W 48/04
(Continued)

FOREIGN PATENT DOCUMENTS

EP 3641424 A1 4/2020
JP 2020170896 A 10/2020
WO 2018208371 A1 11/2018

OTHER PUBLICATIONS

Nokia, et al., "S2-2004858: KI#7: Arch assumption: reconfirmation of assumption of cells of a TA support the same S-NSSAIs," 3GPP SA WG2 Meeting #140-e, Aug. 19-Sep. 2, 2020, Electronic Meeting, 4 pages.

(Continued)

*Primary Examiner* — Fabricio R Murillo Garcia
(74) *Attorney, Agent, or Firm* — Withrow & Terranova, PLLC

(57) ABSTRACT

Systems and methods for heterogeneous slice deployment within a registration area are provided. In some embodiments, a method performed by a User Equipment (UE) for accessing a network slice includes: during registration with a network node, requesting network slice assistance; receiving network slice assistance from the network node indicating access to a first network slice in a first Tracking Area (TA) but not in an entire Registration Area (RA); and accessing the first network slice in the first TA. Some embodiments enable deploying slices in very small geo-
(Continued)

graphical areas to suit special use cases without necessarily having to deploy small RAs. Some of the potentially realizable use cases are in stadiums, factory slices, etc. The ability to deploy small slices within a large RA mitigates problems, such as high registration load, that one might deal with when the RA is too small.

26 Claims, 13 Drawing Sheets

(58) Field of Classification Search
USPC .................................................... 455/435.1
See application file for complete search history.

(56) References Cited

U.S. PATENT DOCUMENTS

| | | | | |
|---|---|---|---|---|
| 2020/0205065 | A1 | 6/2020 | Wei et al. | |
| 2020/0267554 | A1* | 8/2020 | Faccin | H04W 12/06 |
| 2021/0274464 | A1* | 9/2021 | Nord | H04W 36/22 |
| 2021/0337380 | A1* | 10/2021 | Ianev | H04W 48/18 |
| 2023/0052699 | A1* | 2/2023 | Ninglekhu | H04W 48/16 |
| 2023/0209453 | A1* | 6/2023 | Basu | H04W 48/18<br>370/328 |

OTHER PUBLICATIONS

Notice of Reasons for Refusal for Japanese Patent Application No. 2023-537702, mailed Oct. 15, 2024, 9 pages.
Author Unknown, "Technical Specification Group Services and System Aspects; System architecure for the 5G System (5GS); Stage 2 (Release 16)," Technical Specification 23.501, Version 16.7.0, Dec. 2020, 3GPP Organizational Partners, 450 pages.
Author Unknown, "Technical Specification Group Core Network and Terminals; Non-Access-Stratum (NAS) protocol for 5G System (5GS); Stage 3; (Release 16)," Technical Specification 24.501, Version 16.6.0, Sep. 2020, 3GPP Organizational Partners, 723 pages.
Author Unknown, "Technical Specification Group Radio Access Network; NG-RAN; Architecture description (Release 16)," Technical Specification 38.401, Version 16.4.0, Jan. 2021, 3GPP Organizational Partners, 78 pages.
Author Unknown, "Technical Specification Group Radio Access Network; NG-RAN; NG Application Protocol (NGAP) (Release 16)," Technical Specification 38.413, Version 16.4.0, Jan. 2021, 3GPP Organizational Partners, 470 pages.
Ericsson, et al., "S2-177891: 23.501 5.15: Clarification of slice availability in a PLMN," 3GPP WG2 Meeting #123, Oct. 23-27, 2017, Ljubjana, Slovenia, 9 pages.
International Search Report and Written Opinion for International Patent Application No. PCT/IB2022/050486, mailed Apr. 8, 2022, 18 pages.
Examination Report for Indian Patent Application No. 202347054797, mailed Jun. 23, 2026, 8 pages.

* cited by examiner

HETEROGENEOUS SLICE DEPLOYMENT WITHIN A REGISTRATION AREA OF A CELLULAR COMMUNICATIONS NETWORK

RELATED APPLICATIONS

This application is a 35 U.S.C. § 371 national phase filing of International Application No. PCT/IB2022/050486, filed Jan. 20, 2022, which claims the benefit of provisional patent application Ser. No. 63/140,135, filed Jan. 21, 2021, the disclosures of which are hereby incorporated herein by reference in their entireties.

TECHNICAL FIELD

The present disclosure relates to accessing a network slice.

BACKGROUND

FIG. 1 is a schematic block diagram of current Fifth Generation (5G) Radio Access Network (RAN) architecture, also referred to as Next Generation RAN (NG-RAN). The NG-RAN is described in Third Generation Partnership Project (3GPP) Technical Specification (TS) 38.401. The NG architecture can be further described as follows:

- The NG-RAN consists of a set of Enhanced or Evolved Node Bs (eNBs) and New Radio Base Station (gNBs) connected to the Fifth Generation Core (5GC) through the Next Generation (NG) interface.
- An eNB/gNB can support Frequency Division Duplexing (FDD) mode, Time Division Duplexing (TDD) mode or dual mode operation.
- eNB/gNBs can be interconnected through the Xn interface.
- A gNB may consist of a gNB Central Unit (gNB-CU) and gNB Distributed Units (gNB-DUS).
- A gNB-CU and a gNB-DU are connected via F1 logical interface.
- One gNB-DU is connected to only one gNB-CU.

NG, Xn and F1 are logical interfaces. For NG-RAN, the NG and Xn-C interfaces for a gNB consisting of a gNB-CU and gNB-DUs, terminate in the gNB-CU. For New Radio Dual Connectivity (EN-DC), the S1-U and X2-C interfaces for a gNB, consisting of a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all Access and Mobility Management Function (AMFs) within an AMF Region. The AMF Region is defined in 3GPP TS 23.501.

Network Slicing

Network slicing is about creating logically separated partitions of the network, addressing different business purposes. These "network slices" are logically separated to a degree that the network slices can be regarded and managed as networks of their own.

This is a new concept that potentially applies to both Long Term Evolution (LTE) and new 5G Radio Access Technology (RAT), also referred to as New Radio (NR). The key driver for introducing network slicing is business expansion, i.e., improving the cellular operator's ability to serve other industries, e.g., by offering connectivity services with different network characteristics (performance, security, robustness, and complexity).

FIG. 2 is a schematic diagram of a cellular communications network having a common RAN connected to multiple network slices of a core network. The current working assumption is that there will be one shared RAN infrastructure that will connect to several core network instances (with one or more Common Control Network Functions (CCNF) interfacing the RAN, plus additional core network functions which may be slice-specific). As the core network functions are being virtualized, it is assumed that the operator shall instantiate a new core network, or part of it, when a new slice should be supported. For example, slice 0 can be a Mobile Broadband (MBB) slice and slice 1 can be a Machine Type Communication (MTC) network slice.

3GPP is currently working on introduction of enhancements to the network slicing framework introduced to 3GPP 5G System. As of Release 16 (Rel-16), 3GPP specifies that slice availability for a User Equipment (UE) should not change within a Registration Area (RA) that is constructed from a list of Tracking Areas (TAS). The UE expects that all the cells that make up the different TAs in a RA offer the same set of slices that were provided to the UE in the Allowed Network Slice Selection Assistance Information (NSSAI) during the registration procedure. Improved systems and methods for slice deployment within a registration area are needed.

SUMMARY

Systems and methods for heterogeneous slice deployment within a registration area are provided. In some embodiments, a method performed by a User Equipment (UE) for accessing a network slice includes: during registration with a network node, requesting network slice assistance; receiving network slice assistance from the network node indicating access to a first network slice in a first Tracking Area (TA) but not in an entire Registration Area (RA); and accessing the first network slice in the first TA.

Certain aspects of the present disclosure and their embodiments may provide solutions to the aforementioned or other challenges. Heterogeneous slice deployment within a Registration Area (RA) is provided. The proposed solution enables the Application and Mobility Management Function (AMF) to configure a User Equipment (UE) with a RA that contains Tracking Areas (TAS) with heterogenous network slice support. This enables support of a specific network slice in an area limited to a single TA while eliminating the need to assign the UE a RA that is limited to that specific TA only. This is achieved by:

1. Configuring a TA that matches exactly the area covered by the network slice.
2. Including the TA in a RA.
3. Informing the UE of the RA and that the network slice is available only within the TA and not the whole RA.
4. Informing the serving Radio Access Network (RAN) of the slices supported per TA for the UE.

The prior art does not allow deploying slices in areas smaller than a RA. By changing Information Elements (IEs) communicated during different phases of the registration procedure, the suggested solution allows deploying small slices without any changes needed to the ways in which the RA is deployed. The solution also simplifies much of the network planning needed to support network slicing.

There are, proposed herein, various embodiments which address one or more of the issues disclosed herein. In some embodiments, a method is performed by a UE for accessing a network slice, the method comprising one or more of: during registration with a network node, requesting network slice assistance; receiving network slice assistance from the network node indicating access to a first network slice in a first TA but not in an entire RA; and accessing the first network slice in the first TA.

In some embodiments, requesting network slice assistance comprises including a Requested Network Slice Selection Assistance Information (NSSAI) IE in a registration request message; and receiving network slice assistance from the network node comprises receiving an Allowed NSSAI IE, a Rejected NSSAI IE, or both an Allowed NSSAI IE and a Rejected NSSAI IE in a registration accept message from the network node.

In some embodiments, the method further comprises indicating to the network node that the UE is capable of supporting slice deployments that are not available across the entire RA.

In some embodiments, receiving network slice assistance from the network node comprises receiving an indication of which network slices are allowed in each TA of the RA. In some embodiments, the indication of which network slices are allowed in each TA of the RA is received in an Allowed NSSAI IE. In some embodiments, the indication of which network slices are allowed in each TA of the RA is received in an Allowed NSSAI Per TA IE. In some embodiments, the method further comprises not accessing the first network slice in a second TA when the first network slice is not indicated as being allowed in the second TA. In some embodiments, the method further comprises accessing the first network slice at a reduced Quality of Service (QOS) in a second TA when the first network slice is not indicated as being allowed in the second TA.

In some embodiments, receiving network slice assistance from the network node comprises receiving an indication of which network slices are not allowed in each TA of the RA. In some embodiments, the indication of which network slices are not allowed in each TA of the RA is received in a Rejected NSSAI IE. In some embodiments, the indication of which network slices are not allowed in each TA of the RA is received in a Rejected NSSAI Per TA IE. In some embodiments, the method further comprises not accessing the first network slice in a second TA when the first network slice is indicated as being not allowed in the second TA. In some embodiments, the method further comprises accessing the first network slice at a reduced QoS in a second TA when the first network slice is indicated as being not allowed in the second TA.

In some embodiments, receiving network slice assistance from the network node comprises receiving an indication that the first network slice is not available in a current TA. In some embodiments, accessing the first network slice in the first TA comprises: entering the first TA; during registration with the network node, requesting network slice assistance; and receiving network slice assistance from the network node indicating that the first network slice is available in the first TA.

In some embodiments, a UE is configured to communicate with a network node, the UE comprising a radio interface and processing circuitry configured to perform the method of any of the previous embodiments.

In some embodiments, a method is performed by a network node for heterogeneous slice deployment in a RA, the method comprising one or more of: receiving a request for network slice assistance from a UE; determining that the UE is allowed to access a first network slice in a first TA but not in an entire RA; and providing network slice assistance to the UE in accordance with the access to the first network slice in the first TA but not in the entire RA.

In some embodiments, receiving the request for network slice assistance comprises receiving a Requested NSSAI IE in a registration request message; and providing network slice assistance to the UE comprises including an Allowed NSSAI IE, a Rejected NSSAI IE, or both an Allowed NSSAI IE and a Rejected NSSAI IE in a registration accept message to the UE.

In some embodiments, the method further comprises receiving an indication from the UE that the UE is capable of supporting slice deployments that are not available across the entire RA.

In some embodiments, if the network node does not have an indication that the UE is capable of supporting slice deployments that are not available across the entire RA, providing network slice assistance to the UE comprises indicating the UE is not allowed to access the first network slice in the RA.

In some embodiments, determining that the UE is allowed to access the first network slice in the first TA but not the entire RA comprises: determining that an area covered by the first network slice is less than the entire RA; and configuring the first TA to match the area covered by the first network slice.

In some embodiments, providing network slice assistance to the UE comprises providing an indication of which network slices are allowed in each TA of the RA. In some embodiments, the indication of which network slices are allowed in each TA of the RA is provided in an Allowed NSSAI IE. In some embodiments, the indication of which network slices are allowed in each TA of the RA is provided in an Allowed NSSAI Per TA IE. In some embodiments, the UE is not allowed access to the first network slice in a second TA when the first network slice is not indicated as being allowed in the second TA. In some embodiments, the UE is allowed access to the first network slice at a reduced QoS in a second TA when the first network slice is not indicated as being allowed in the second TA.

In some embodiments, providing network slice assistance to the UE comprises providing an indication of which network slices are not allowed in each TA of the RA. In some embodiments, the indication of which network slices are not allowed in each TA of the RA is provided in a Rejected NSSAI IE. In some embodiments, the indication of which network slices are not allowed in each TA of the RA is provided in a Rejected NSSAI Per TA IE. In some embodiments, the UE is not allowed access to the first network slice in a second TA when the first network slice is indicated as being not allowed in the second TA. In some embodiments, the UE is allowed access to the first network slice at a reduced QoS in a second TA when the first network slice is indicated as being not allowed in the second TA.

In some embodiments, providing network slice assistance to the UE comprises providing an indication that the first network slice is not available in a current TA. In some embodiments, the method further comprises receiving another request for network slice assistance when the UE enters the first TA and providing network slice assistance to the UE indicating that the first network slice is available in the first TA.

In some embodiments, a network node is configured to communicate with a UE, the network node comprising processing circuitry configured to perform the method of any of the previous embodiments.

Certain embodiments may provide one or more of the following technical advantage(s). The proposed solution enables deploying slices in very small geographical areas to suit special use cases without necessarily having to deploy small RAs. Some of the potentially realizable use cases are in stadiums, factory slices, etc. The ability to deploy small slices within a large RA mitigates problems, such as high registration load, that one might deal with when the RA is too small. At the same time, this circumvents the 3GPP requirement to deploy slices across a RA where the business/deployment need does not require it.

The different embodiments described herein explore the different tradeoffs with the above solution. Some embodiments keep the messaging simple (Non-Access Stratum (NAS) registration accept message) at the expense of potentially more signaling to the UE with UE mobility. Some embodiments suggest the use of a more complex message structure that keeps the signaling load between the UE and the network unchanged when compared to prior approaches.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
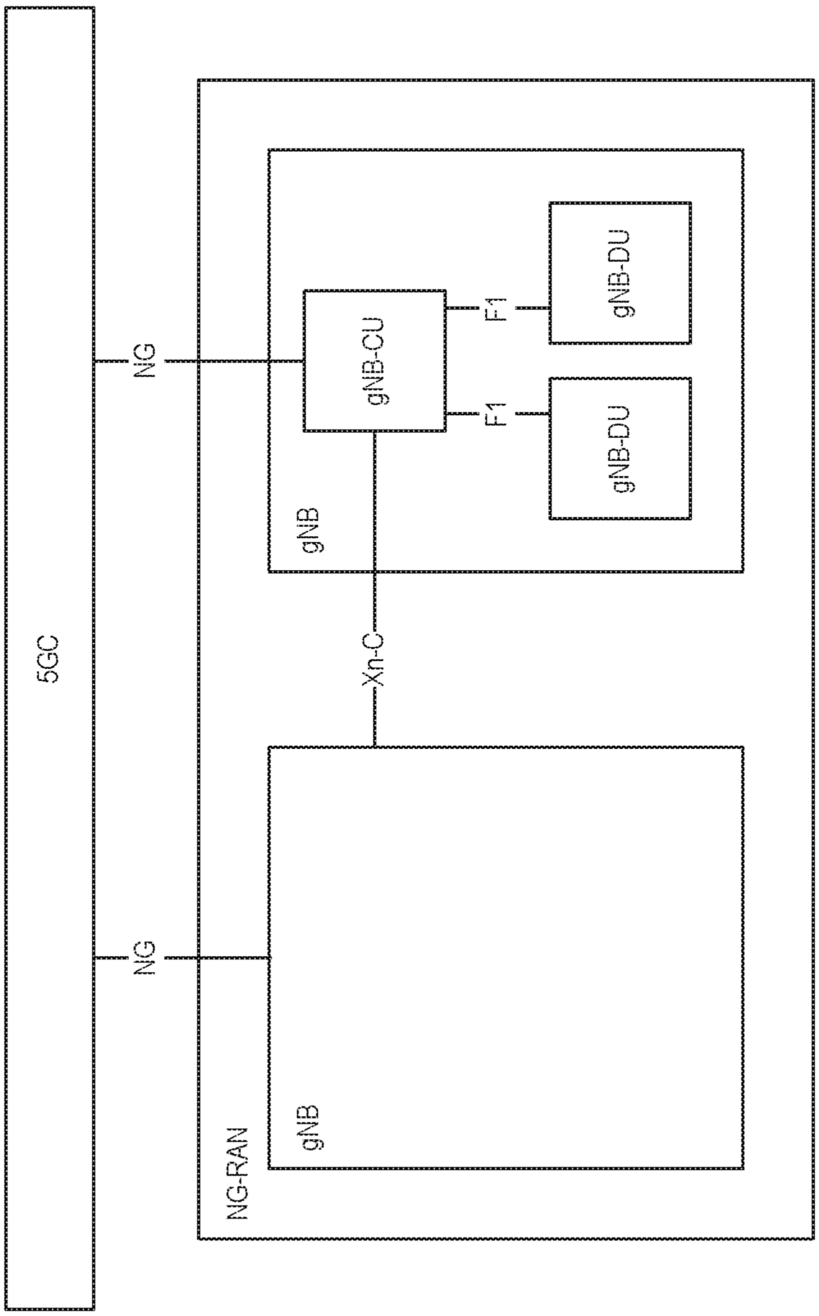
FIG. 1 is a schematic block diagram of current Fifth Generation (5G) Radio Access Network (RAN) architecture, also referred to as Next Generation RAN (NG-RAN)
Figure 2:
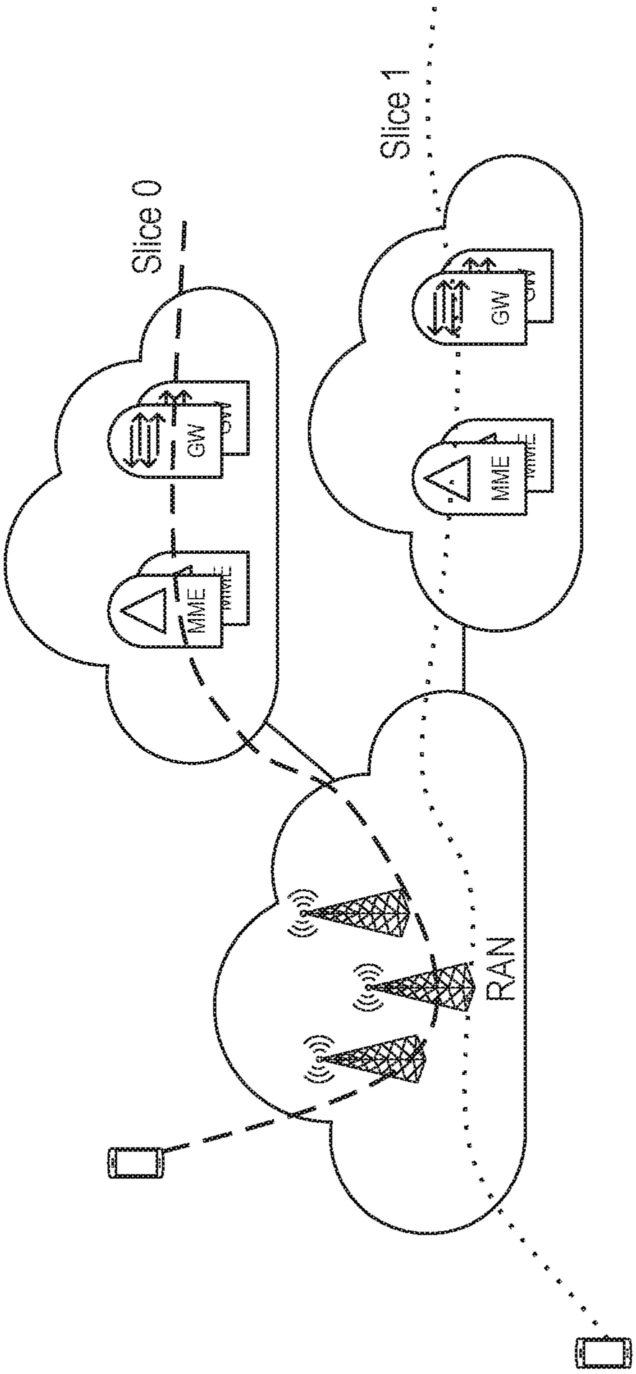
FIG. 2 is a schematic diagram of a cellular communications network having a common RAN connected to multiple network slices of a core network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
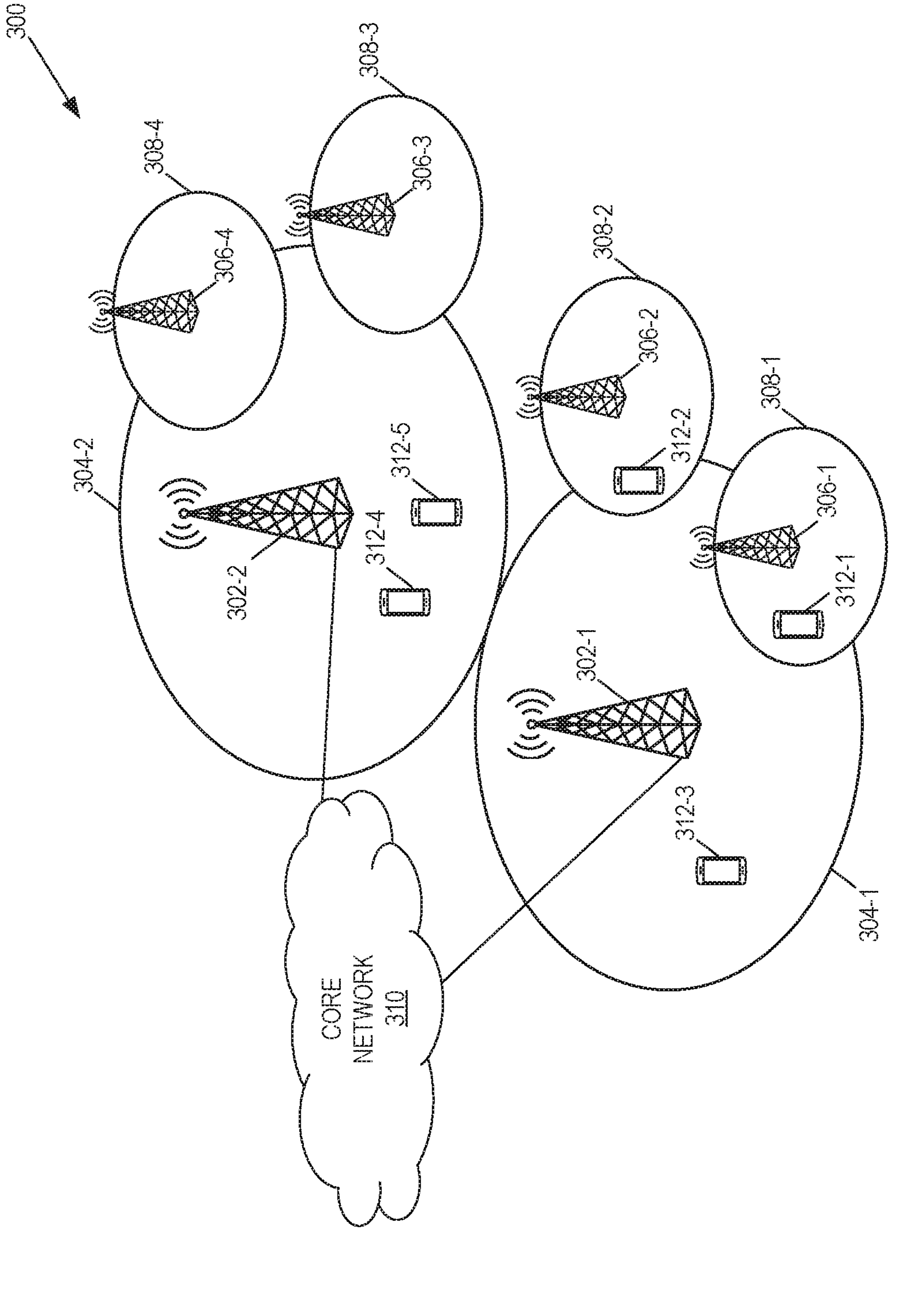
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a Next Generation RAN (NG-RAN) and a 5G Core (5GC). In this example, the RAN includes base stations 302-1 and 302-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5G System (5GS) is referred to as the 5GC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Figure 4:
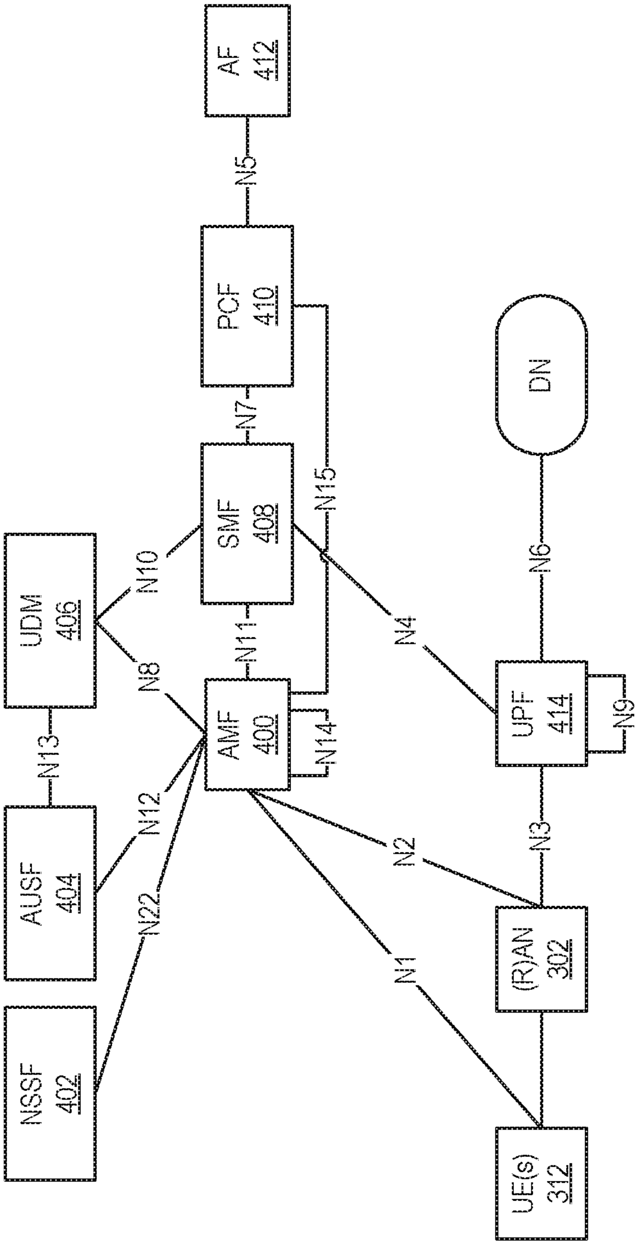
FIG. 4 illustrates a wireless communication system represented as a 5G network architecture composed of core Network Functions (NFs), where interaction between any two NFs is represented by a point-to-point reference point/interface, according to some embodiments of the present disclosure.

FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs 312 connected to either a RAN 302 or an Access Network (AN) as well as an AMF 400. Typically, the R (AN) 302 comprises base stations, e.g. such as eNBs or gNBs or similar. Seen from the core network side, the 5GC NFs shown in FIG. 4 include a NSSF 402, an AUSF 404, a UDM 406, the AMF 400, a SMF 408, a PCF 410, and an Application Function (AF) 412.

Reference point representations of the 5G network architecture are used to develop detailed call flows in the normative standardization. The N1 reference point is defined to carry signaling between the UE 312 and AMF 400. The reference points for connecting between the AN 302 and AMF 400 and between the AN 302 and UPF 414 are defined as N2 and N3, respectively. There is a reference point, N11, between the AMF 400 and SMF 408, which implies that the SMF 408 is at least partly controlled by the AMF 400. N4 is used by the SMF 408 and UPF 414 so that the UPF 414 can be set using the control signal generated by the SMF 408, and the UPF 414 can report its state to the SMF 408. N9 is the reference point for the connection between different UPFs 414, and N14 is the reference point connecting between different AMFs 400, respectively. N15 and N7 are defined since the PCF 410 applies policy to the AMF 400 and SMF 408, respectively. N12 is required for the AMF 400 to perform authentication of the UE 312. N8 and N10 are defined because the subscription data of the UE 312 is required for the AMF 400 and SMF 408.

The 5GC network aims at separating UP and CP. The UP carries user traffic while the CP carries signaling in the network. In FIG. 4, the UPF 414 is in the UP and all other NFs, i.e., the AMF 400, SMF 408, PCF 410, AF 412, NSSF 402, AUSF 404, and UDM 406, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 400 and SMF 408 are independent functions in the CP. Separated AMF 400 and SMF 408 allow independent evolution and scaling. Other CP functions like the PCF 410 and AUSF 404 can be separated as shown in FIG. 4. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 5:
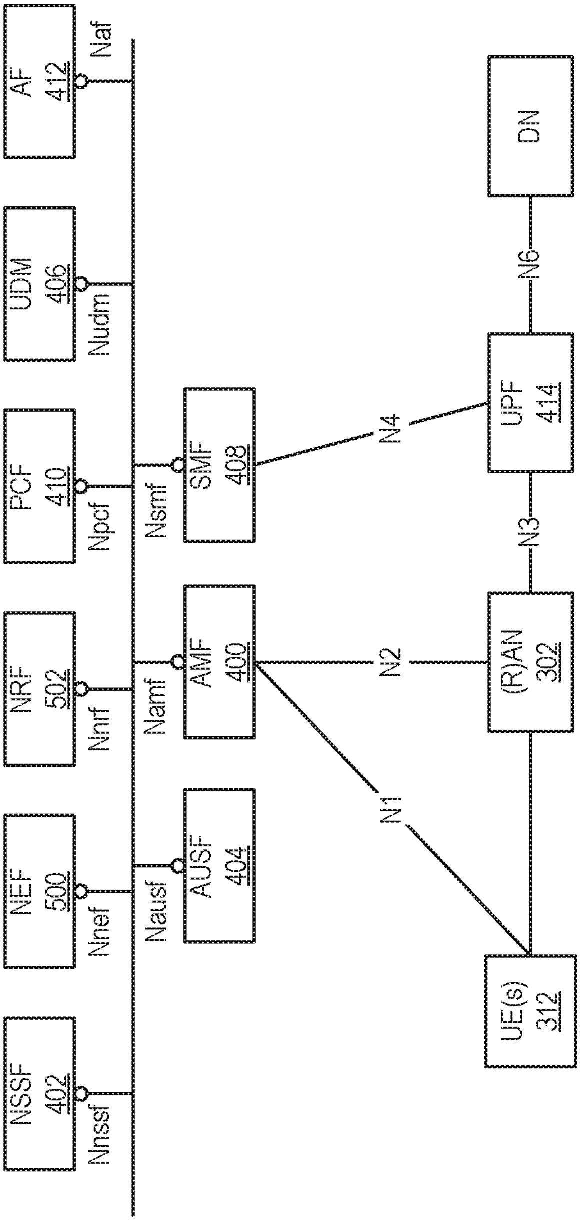
FIG. 5 illustrates a 5G network architecture using service-based interfaces between the NFs in the Control Plane (CP), instead of the point-to-point reference points/interfaces used in the 5G network architecture of FIG. 4, according to some embodiments of the present disclosure.

FIG. 5 illustrates a 5G network architecture using service-based interfaces between the NFs in the CP, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g. Namf for the service based interface of the AMF 400 and Nsmf for the service based interface of the SMF 408, etc. The NEF 500 and the NRF 502 in FIG. 5 are not shown in FIG. 4 discussed above. However, it should be clarified that all NFs depicted in FIG. 4 can interact with the NEF 500 and the NRF 502 of FIG. 5 as necessary, though not explicitly indicated in FIG. 4.

Some properties of the NFs shown in FIGS. 4 and 5 may be described in the following manner. The AMF 400 provides UE-based authentication, authorization, mobility management, etc. A UE 312 even using multiple access technologies is basically connected to a single AMF 400 because the AMF 400 is independent of the access technologies. The SMF 408 is responsible for session management and allocates Internet Protocol (IP) addresses to UEs. It also selects and controls the UPF 414 for data transfer. If a UE 312 has multiple sessions, different SMFs 408 may be allocated to each session to manage them individually and possibly provide different functionalities per session. The AF 412 provides information on the packet flow to the PCF 410 responsible for policy control in order to support Quality of Service (QOS). Based on the information, the PCF 410 determines policies about mobility and session management to make the AMF 400 and SMF 408 operate properly. The AUSF 404 supports authentication function for UEs or similar and thus stores data for authentication of UEs or similar while the UDM 406 stores subscription data of the UE 312. The Data Network (DN), not part of the 5GC network, provides Internet access or operator services and similar.

A NF may be implemented either as a network element on a dedicated hardware, as a software instance running on a dedicated hardware, or as a virtualized function instantiated on an appropriate platform, e.g., a cloud infrastructure.

Expecting that the network slices are homogeneously deployed across a RA restricts slice deployments to be tightly coupled with RAs. In general, a RA is a large geographic area served by multiple nodes (defined by TA list, and all the TAs are served by the same AMF) that defines the granularity at which the UE location is known when the UE is not Radio Resource Control (RRC) connected. The RAs are configured by taking into account UE mobility and for large enough areas to ensure that there are not too many UE mobility driven registrations. RAs typically cover considerable geographic areas.

The requirements of homogeneous slice deployment within a RA forces the operators to define RAs that may be composed of very few TAs. This is especially true when business/technical requirements necessitate the deployment of a slice in a limited geographic area. The resulting RAs may become so small that registration activities due to UE mobility across the RAs may become so frequent that the registration activities interfere with the network's ability to provide its normal services.

Systems and methods for heterogeneous slice deployment within a registration area are provided. In some embodiments, a method performed by a User Equipment (UE) for accessing a network slice includes: during registration with a network node, requesting network slice assistance; receiving network slice assistance from the network node indicating access to a first network slice in a first Tracking Area (TA) but not in an entire Registration Area (RA); and accessing the first network slice in the first TA. Some embodiments enable deploying slices in very small geographical areas to suit special use cases without necessarily having to deploy small RAs. Some of the potentially realizable use cases are in stadiums, factory slices, etc. The ability to deploy small slices within a large RA mitigates problems, such as high registration load, that one might deal with when the RA is too small.

Figure 6:
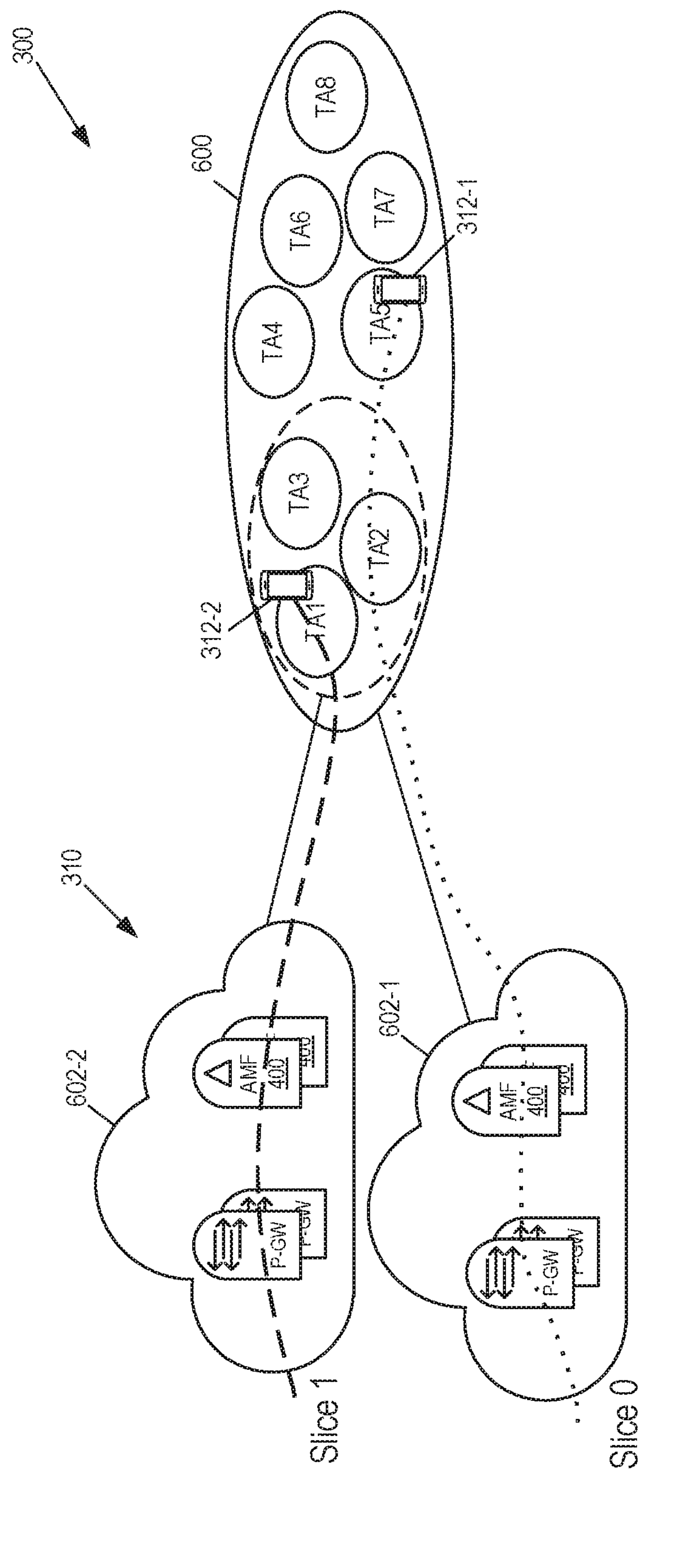
FIG. 6 illustrates the cellular communications system of FIG. 3 providing heterogeneous deployment of network slices within a Registration Area (RA), according to some embodiments of the present disclosure.

FIG. 6 illustrates the cellular communications system 300 of FIG. 3 providing heterogeneous deployment of network slices within a Registration Area (RA) 600. The cellular communications system 300 includes a NG-RAN infrastructure that can connect to multiple network slices 602-1, 602-2. Embodiments described herein enable the AMF 400 to configure a UE 312 with a RA 600 that contains Tracking Areas (TAS) TA1-TA8 with heterogenous network slice support. For example, a first network slice 602-1 (e.g., slice 0) can be supported in the entire RA 600 while a second network slice 602-2 (e.g., slice 1) can be supported only in TA1, TA2, and TA3.

This enables support of a specific network slice 602 in an area as small as a single TA while eliminating the need to assign the UE 312 a RA 600 that is limited to that specific TA only. This is achieved by:

1. Configuring a TA (e.g., TA1, TA2, TA3) that matches exactly the area covered by the network slice 602.
2. Including the TA in a RA 600.
3. Informing the UE 312 of the RA 600 and that the network slice 602 is available only within the TA and not the whole RA 600.
4. Informing the serving RAN of the slices 602 supported per TA for the UE 312.

In this regard, during registration in a Public Land Mobile Network (PLMN), as part of the Non-Access Stratum (NAS) procedures defined in 3GPP Technical Specification (TS) 24.501 16.6.0, the UE 312 includes an Information Element (IE) called 'Requested NSSAI' as part of the registration request message. The IE contains a set of Single Network Slice Selection Assistance Information (S-NSSAI) that indicates the set of network slices 602 that the UE 312 requests permission to use in the PLMN. Upon reception of this IE, the core network takes this information into account to determine a RA 600 for the UE 312. Then, based on the slice deployment, UE subscription, and other policies, it determines the set of S-NSSAIs that the UE 312 is allowed and not allowed to use within the RA in terms of the Allowed Network Slice Selection Assistance Information (NSSAI) and Rejected NSSAI IEs and communicates this via the NAS registration accept message towards the UE 312. The set of allowed and rejected S-NSSAIs in the response are assumed to be valid throughout the current RA.

First, the UE capability requirements that are general to embodiments described herein are listed. The UE 312 needs to indicate to the network that it is capable of supporting messages that indicate slice deployments that are not available across a RA 600. This can be indicated by a new UE capability to the network, e.g., in the UE Fifth Generation Mobility Management (5GMM) capability, UE Fifth Generation Session Management (5GSM) capability or a new IE. When the UE 312 does not indicate this capability, the network automatically assumes that the UE 312 should not be allowed on any of the slices 602 that are not deployed uniformly throughout a RA. This prevents any future attempts by the UEs 312 to use slices 602 that are not deployed throughout a RA 600.

In another variant, if the UE 312 does not support the capabilities, the network assumes that the UE 312 expects uniform access to all slices 602 in the Allowed NSSAI throughout the RA 600 and therefore the network may serve some slices 602 with limited QoS in certain areas of the RA 600, while with optimized QoS in other areas of the RA 600.

Embodiment 1: Augment Allowed Slice Information with Per TA Information

As means to communicate non-homogeneous slice deployment within the RA to the UE, a first embodiment adds information in the messages sent to the UE to communicate which network slices that are included in the Allowed NSSAI are allowed in which TAs. This can be achieved over multiple means, e.g., through the registration accept message, or through other NAS messages. In each case, the communication involves sending the UE information about TAs constituting its RA and which slices are explicitly allowed in those TAS.

This can be achieved by adding, in addition to or instead of the Allowed NSSAI, an optional IE, e.g., "Allowed NSSAI Per TA" (to the registration accept message, or other similar NAS message) that contains a set of S-NSSAI where each S-NSSAI is associated with one or more TA Informations (TAIs) in the current RA in which the S-NSSAIs is allowed.

The UE interprets the S-NSSAIs present in the message as the S-NSSAIs considered to be allowed in the explicitly listed TAs and not allowed in the other TAS, i.e., slices that are not listed in a certain TA are considered as unavailable within that TA. This information has to be looked alongside with the rejected S-NSSAI list, which is transmitted according to the spec without any TA specific information and applies to all TAs within the RA with the exception of those marked as allowed in the modified IE.

In a depending embodiment, the new list of slices per TA signaled to the UE implies that the slices listed per TA are served with optimal QoS in such TAs. When the UE is in a TA where a certain slice is not listed, the UE may still access that slice, but the network will serve that slice with limited QoS. In a depending embodiment, such different levels of QoS can be configured by the core network to the RAN by means of the Alternative QoS Parameters Set List defined in 3GPP TS 38.413.

This list contains a number of QoS parameters sets associated to the same Packet Data Unit (PDU) Session. In one example, a PDU Session associated to a certain slice may be served with the best QoS parameters set when the UE is in the TA to which the slice is associated (as part of the NAS signaling described above), while the PDU Session associated to the same slice may be served with the lower QoS parameters sets (included in the Alternative QOS Parameters Set List) when the UE is not in the TA to which the slice is associated.

By means of these depending embodiments, the additional information signaled to the UE in the form of list of slices per TA represent the TAs on which the listed slices would receive maximum Qos, while outside such TAs the slices would receive lower QoS.

As the Alternative QOS Parameters Set List defined in 3GPP TS 38.413 was defined to serve applications with adaptive QoS, new (but basically equivalent) signaling could be defined, in order to keep the current alternative QoS signaling independent from QoS Parameter signaling related to QoS support in non-supported slices.

Embodiment 2: Augment Rejected Slice Information with Per TA Information

A second embodiment is similar to the first embodiment, but the same end-goal can be reached by communicating what is not allowed when compared to communicating what is allowed. In this case, an optional IE is added which communicates the mapping between which slices in the RA are not allowed in certain TAs. The UE interprets the S-NSSAIs present in the message as the S-NSSAIs considered not to be allowed in the explicit related listed TAs. For TAs which do not mention a specific S-NSSAI as not allowed, the UE assumes that the slice is available on that TA. It is important to note that here the rejected S-NSSAI list is only augmented with TA information. The allowed S-NSSAI list is still also sent to the UE without any modification from the current specification. This facilitates the UE to get an understanding of which slices are in general allowed with more specific rejected S-NSSAI information.

As per the previous embodiment, some embodiments here consist of interpreting the new list of S-NSSAIs not allowed per TA as a list of S-NSSAIs for which maximum QoS will not be achieved in the associated TAs.

Embodiment 3: Augment Allowed and Rejected Slice Information with Per TA Information In a third embodiment, combinations of allowed and not allowed S-NSSAIs per TAIs can also be used to communicate the same capability per TA to the UE. In this case, the optional IE structure includes support for mentioning S-NSSAIs as allowed and not allowed within a TA. When S-NSSAIs are listed as allowed, then the UE interprets that the S-NSSAI is allowed in the current TA and not supported in other TAs (except for other TAs who list the corresponding S-NSSAI as allowed). When a S-NSSAI is listed as not allowed, then the UE assumes that the other TAs (which do not have the specific S-NSSAI as not allowed) have support for this slice. This suggested optional IE structure that facilitates in communicating both allowed and not allowed slices in an expanded form, i.e., the UE does not need to compare to globally allowed or not allowed slices and derive applicable rules per TA.

As above, in an alternative embodiment, when S-NSSAIs are listed as allowed, then the UE interprets that the S-NSSAI is allowed in the current TA with maximum QoS and supported in other TAs with lower QoS (except for other TAs who list the corresponding S-NSSAI as allowed). When a S-NSSAI is listed as not allowed, then the UE assumes that the other TAs (which do not have the specific S-NSSAI as not allowed) support this slice with maximum QoS.

Embodiment 4: Augment Slice Rejection Message with Current TA Information

The Rejected S-NSSAI IE has the following supported cause values (3GPP TS 24.501 16.6.0):

| Cause value (octet 3) | | | | |
|---|---|---|---|---|
| Bits | | | | |
| 4 | 3 | 2 | 1 | |
| 0 | 0 | 0 | 0 | S-NSSAI not available in the current PLMN or SNPN |
| 0 | 0 | 0 | 1 | S-NSSAI not available in the current registration area |
| 0 | 0 | 1 | 0 | S-NSSAI not available due to the failed or revoked network slice-specific authentication and authorization. |

To enable deploying slices in areas smaller than the RA, in a fourth embodiment the Rejected S-NSSAI IE includes a cause value "S-NSSAI not available in current Tracking Area." This cause value indicates to the UE that the S-NSSAI is not supported in the current TA but might be available in the other TAs that are part of the current RA. Note that the UE is also configured with the current RA, i.e., the set of TAS in the registration accept message.

Whenever the UE finds that it is in a new TA within the same RA, the UE assumes that the slice that was rejected in the previous TA is available in the current TA and can attempt to use the slice either for new PDU sessions, or earlier PDU sessions can be reallocated to the newly allocated slice by the core. The reasoning here being that the UE was only explicitly rejected to use the slice on the previous TA, and the same slice is also on the set of available slices in the current RA. However, the core can still reject the slice on the new TA as well. This new cause value facilitates the deployment of slices on a per-TA-level.

As part of this embodiment, the UEs can also maintain a memory of slices that were rejected in certain TAs. This memory is maintained as long as the UE is within the same RA, or the UE deregisters. At every UE power on/off, this memory shall be cleared too. This prevents the UE from re-requesting for slices that were previously rejected in a TA.

Handling PDU Sessions in Unsupported Slices

It might be the case that a UE will camp on or connect to a cell that does not support one or more of the S-NSSAIs on which the UE has established PDU sessions. In these cases, the following is proposed:

1. UE in CM-IDLE and/or CM-CONNECTED state can keep the PDU Session on NAS layer even if the cell on which the UE is currently camping or is served by is configured on a TA where the S-NSSAI (network slice) associated with that PDU Session is not among the set of allowed network slices (S-NSSAIs)/Allowed NSSAI provided to the UE by the network for this TA.

2. UE in CM-CONNECTED with RRC_INACTIVE state can keep the PDU Session on NAS layer even if the cell on which the UE is currently camping or is served by is configured on a TA where the S-NSSAI (network slice) associated with that PDU Session is not among the set of allowed network slices (S-NSSAIs)/Allowed NSSAI provided to the UE by the network for this TA.

3. UE in CM-CONNECTED with RRC_INACTIVE state can keep the access stratum configuration for resources associated with PDU Session even if the cell on which the UE is currently camping or is served by is configured on a TA where the S-NSSAI (network slice) associated with that PDU Session is not among the set of allowed network slices (S-NSSAIs)/Allowed NSSAI provided to the UE by the network for this TA.

In a dependent embodiment the list of slices allowed in a TA, as described above, can be interpreted as the list of slices receiving maximum QoS treatment in that TA, while the list of slices not allowed in a TA, as described above, can be interpreted as the list of slices receiving lower than maximum QOS treatment in that TA.

Embodiment 5: Exchange of Allowed/Preferred S-NSSAI List Per TA from Core Network to RAN Nodes From the embodiments above it can be derived that the new information signaled to the UE can either be in the form of a List of Allowed/not-Allowed S-NSSAIs per TA or in the form of a List of Preferred/Not-Preferred S-NSSAIs per TA.

In a fifth embodiment the List of Allowed/Preferred S-NSSAIs per TA, associated to the UE, is signaled from the core network to the RAN serving the UE. As an example, such information could be signaled as part of the NG: INITIAL UE CONTEXT SETUP message or NG: UE CONTEXT MODIFICATION REQUEST message.

With this information, the RAN is able to determine the TA on which slices are allowed or are supported with maximum QoS and on the basis of that the RAN is able to trigger UE mobility with the intent to achieve service continuity by handing over the UE to cells of TAs where the slice in use by the UE is supported, or to achieve maximization of QoS treatment for the slice services in use by the UE by means of handing over the UE to cells of TAs where the slice in use by the UE is served with maximum QoS.

If the List of Allowed/Preferred S-NSSAIs per TA is exchanged for the List of not-Allowed/not-Preferred S-NSSAIs per TA, the RAN would gain awareness of the TAS within which the slices listed are not allowed or not served with maximum QoS and on the basis of that the RAN may try not to handover the UE towards cells of those TAs, if the UE has active services of slices listed for such TAs.

Figure 7:
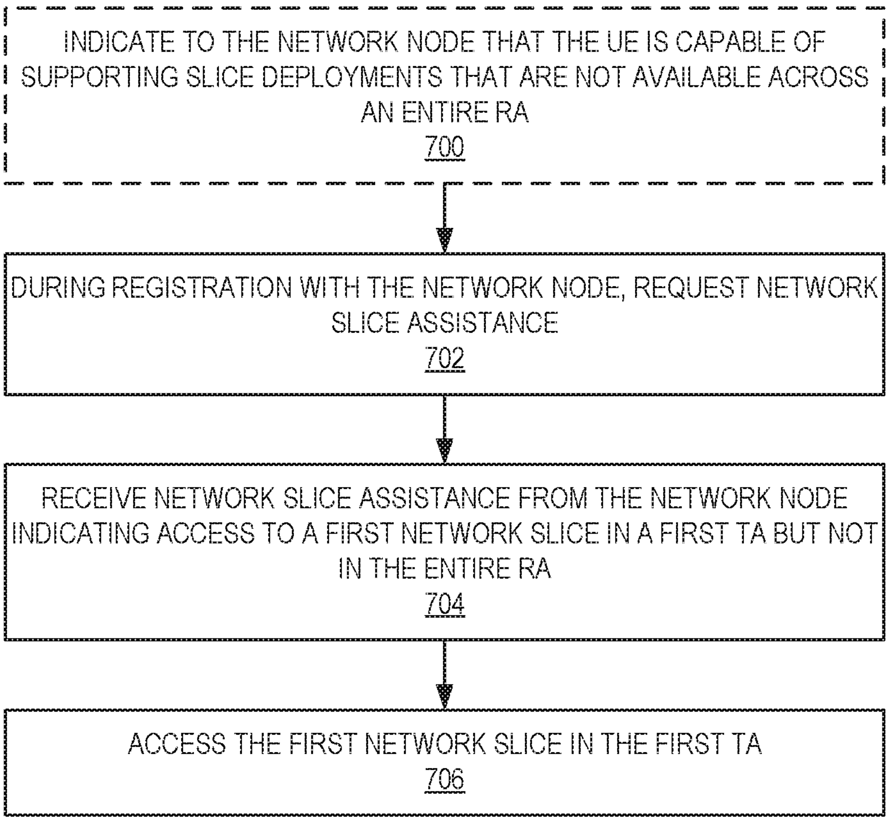
FIG. 7 is a flow diagram of a method for accessing a network slice, according to some embodiments of the present disclosure.

FIG. 7 is a flow diagram of a method for accessing a network slice, according to some embodiments of the present disclosure. The method may be performed by a UE. The method optionally begins at step 700, with indicating to the network node that the UE is capable of supporting slice deployments that are not available across an entire RA. The method continues at step 702, with, during registration with the network node, requesting network slice assistance. The method continues at step 704, with receiving network slice assistance from the network node indicating access to a first network slice in a first TA but not in the entire RA. The method continues at step 706, with accessing the first network slice in the first TA. Some embodiments enable deploying slices in very small geographical areas to suit special use cases without necessarily having to deploy small RAs. Some of the potentially realizable use cases are in stadiums, factory slices, etc. The ability to deploy small slices within a large RA mitigates problems, such as high registration load, that one might deal with when the RA is too small.

Figure 8:
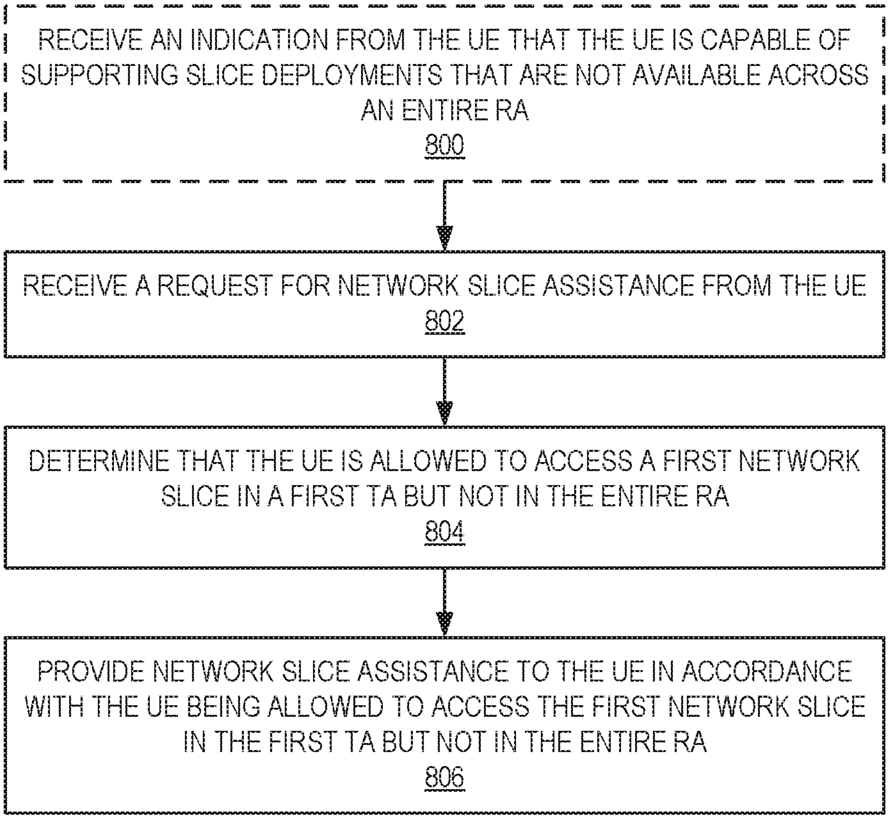
FIG. 8 is a flow diagram of a method for heterogeneous slice deployment in a RA.

FIG. 8 is a flow diagram of a method for heterogeneous slice deployment in a RA. The method may be performed by a network node. The method optionally begins at step 800, with receiving an indication from the UE that the UE is capable of supporting slice deployments that are not available across an entire RA. The method continues at step 802, with receiving a request for network slice assistance from the UE. The method continues at step 804, with determining that the UE is allowed to access a first network slice in a first TA but in not the entire RA. The method continues at step 806, with providing network slice assistance to the UE in accordance with the UE being allowed to access the first network slice in the first TA but not in the entire RA. Some embodiments enable deploying slices in very small geographical areas to suit special use cases without necessarily having to deploy small RAs. Some of the potentially realizable use cases are in stadiums, factory slices, etc. The ability to deploy small slices within a large RA mitigates problems, such as high registration load, that one might deal with when the RA is too small.

Figure 9:
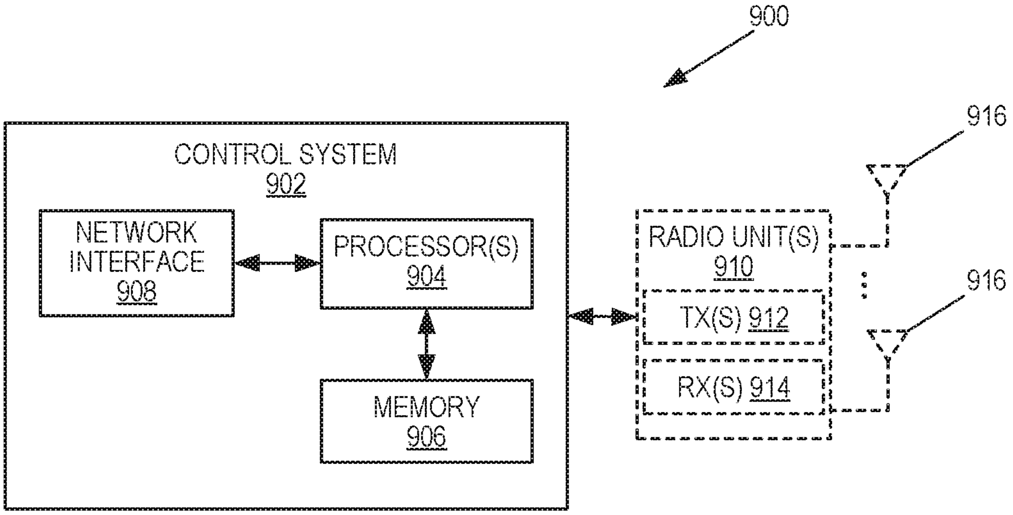
FIG. 9 is a schematic block diagram of a network node according to some embodiments of the present disclosure.

FIG. 9 is a schematic block diagram of a network node 900 according to some embodiments of the present disclosure. Optional features are represented by dashed boxes. The network node 900 may be, for example, a base station 302 or 306 or another network node that implements all or part of the functionality of the base station 302 or gNB described herein. In some embodiments, the network node 900 implements one or more functions of a core network. As illustrated, the network node 900 includes a control system 902 that includes one or more processors 904 (e.g., Central Processing Units (CPUs), Application Specific Integrated Circuits (ASICs), Field Programmable Gate Arrays (FPGAS), and/or the like), memory 906, and a network interface 908. The one or more processors 904 are also referred to herein as processing circuitry. In addition, the network node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a network node 900 as described herein. In some embodiments, the function(s) are implemented in software that is stored, e.g., in the memory 906 and executed by the one or more processors 904.

Figure 10:
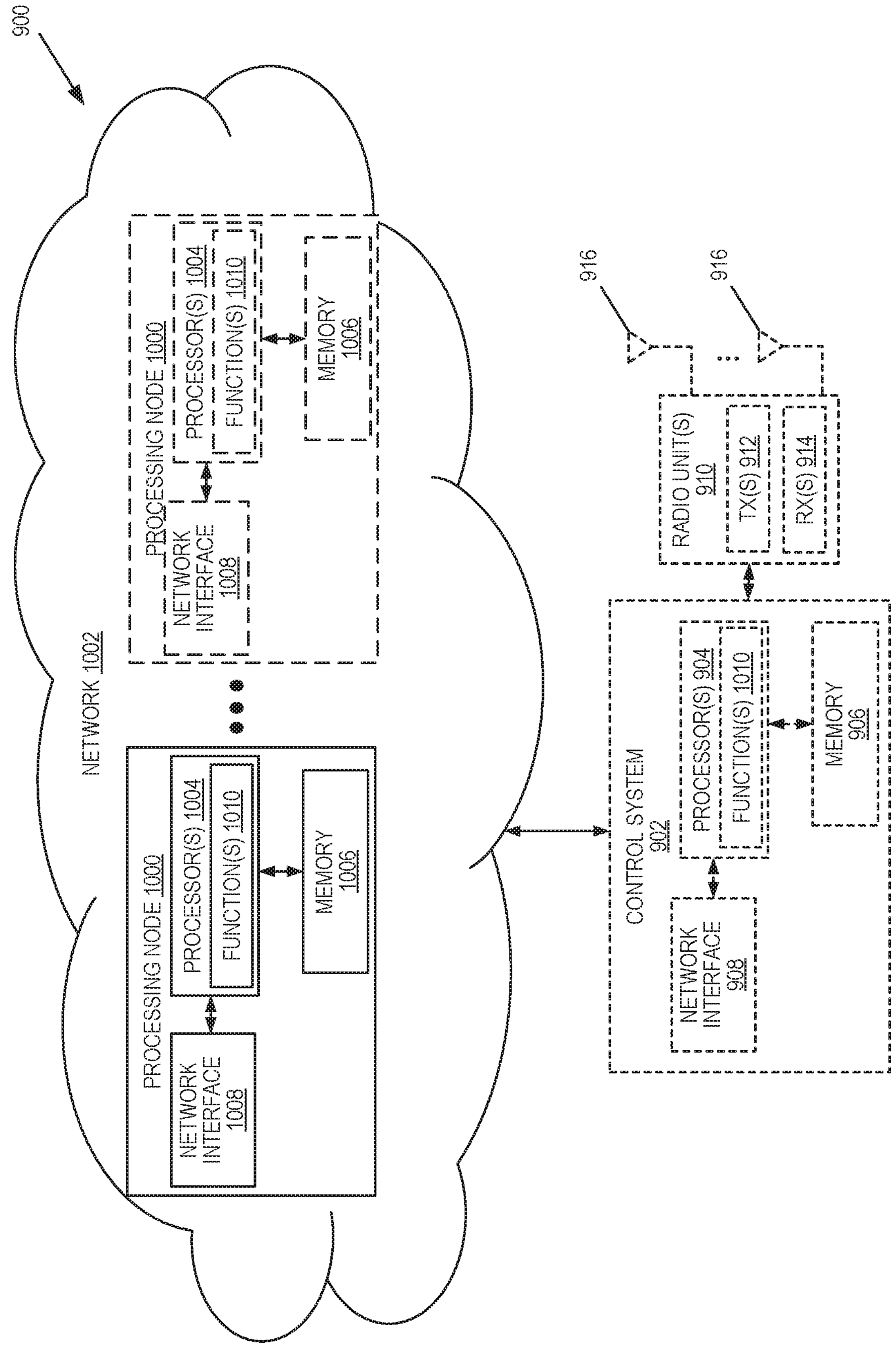
FIG. 10 is a schematic block diagram that illustrates a virtualized embodiment of the network node according to some embodiments of the present disclosure.

FIG. 10 is a schematic block diagram that illustrates a virtualized embodiment of the network node 900 according to some embodiments of the present disclosure. This discussion is equally applicable to a radio access node and other types of network nodes. Further, other types of network nodes may have similar virtualized architectures. Again, optional features are represented by dashed boxes.

As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 may include the control system 902 and/or the one or more radio units 910, as described above. The control system 902 may be connected to the radio unit(s) 910 via, for example, an optical cable or the like. The network node 900 includes one or more processing nodes 1000 coupled to or included as part of a network(s) 1002. If present, the control system 902 or the radio unit(s) are connected to the processing node(s) 1000 via the network 1002. Each processing node 1000 includes one or more processors 1004 (e.g., CPUs, ASICS, FPGAS, and/or the like), memory 1006, and a network interface 1008.

In this example, functions 1010 of the network node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the network node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of network node 900 or a node (e.g., a processing node 1000) implementing one or more of the functions 1010 of the network node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
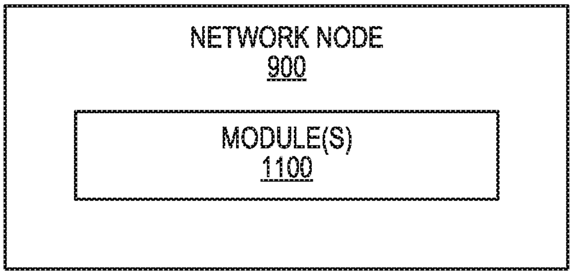
FIGS. 11 through 13 are schematic block diagrams of example embodiments of a radio access node.

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
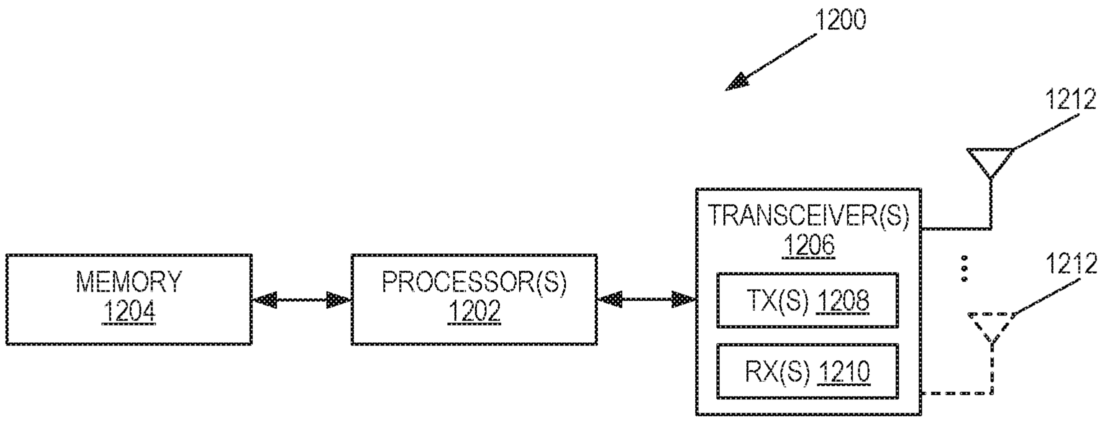

FIG. 12 is a schematic block diagram of a wireless communication device 1200 according to some embodiments of the present disclosure. As illustrated, the wireless communication device 1200 includes one or more processors 1202 (e.g., CPUs, ASICS, FPGAS, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the wireless communication device 1200 described above may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
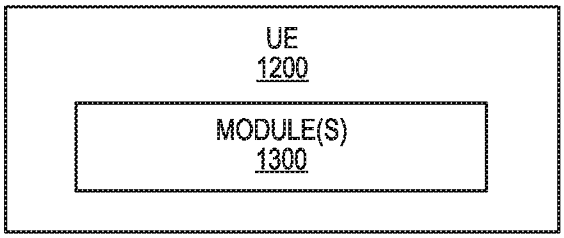

FIG. 13 is a schematic block diagram of the wireless communication device 1200 according to some other embodiments of the present disclosure. The wireless communication device 1200 includes one or more modules 1300, each of which is implemented in software. The module(s) 1300 provide the functionality of the wireless communication device 1200 described herein.

Figure 14:
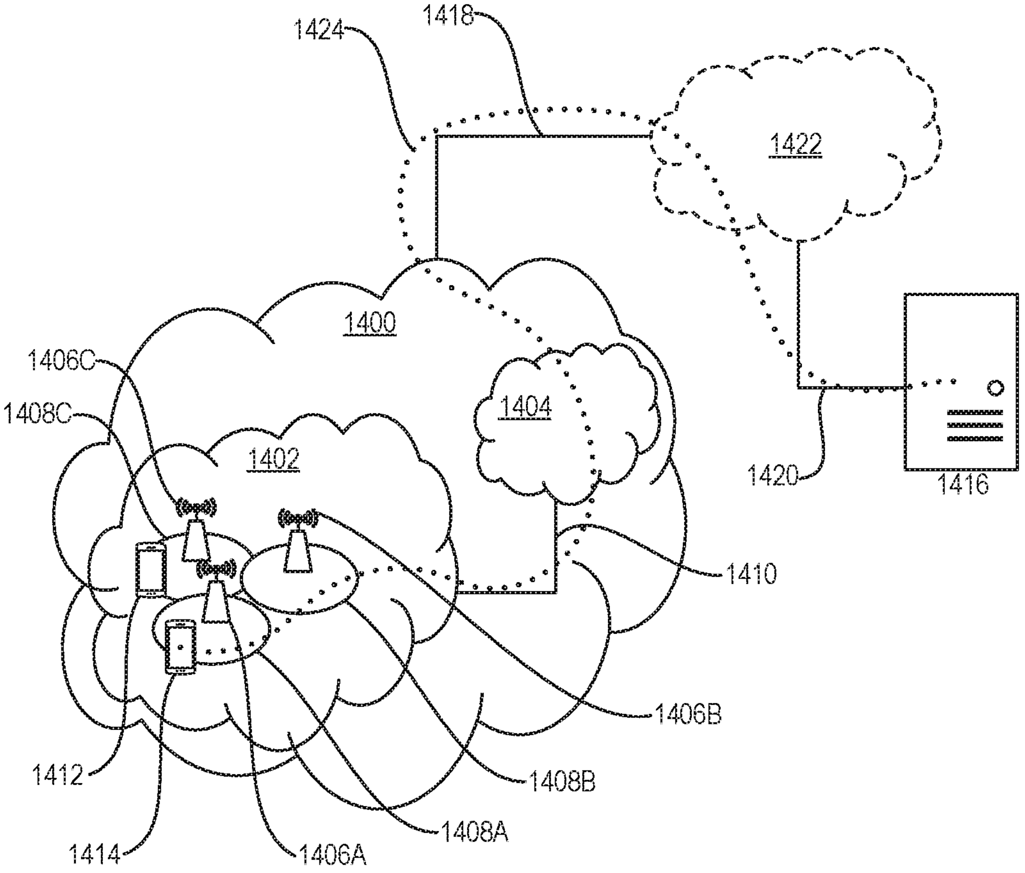
FIGS. 14 and 15 are schematic block diagrams of a UE.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICS, FPGAS, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICS, FPGAS, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICS, FPGAS, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
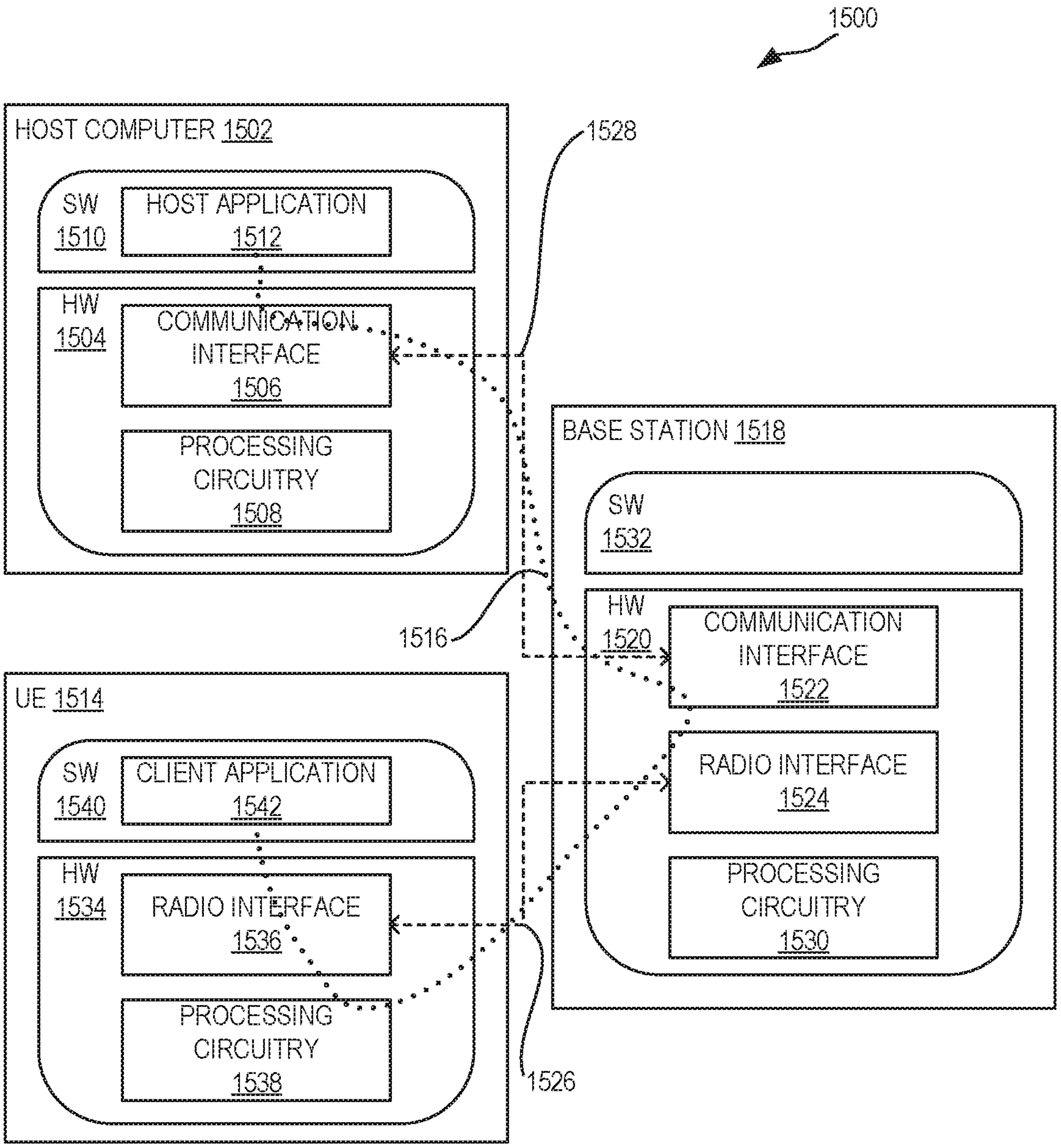

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Group A Embodiments

Embodiment 1: A method performed by a User Equipment, UE, (312) for accessing a network slice, the method comprising one or more of: during registration with a network node (900), requesting (702) network slice assistance; receiving (704) network slice assistance from the network node indicating access to a first network slice in a first Tracking Area, TA, but not in an entire Registration Area, RA; and accessing (706) the first network slice in the first TA.

Embodiment 2: The method of embodiment 1, wherein: requesting (702) network slice assistance comprises including a Requested Network Slice Selection Assistance Information, NSSAI, Information Element, IE, in a registration request message; and receiving (704) network slice assistance from the network node (900) comprises receiving an Allowed NSSAI IE, a Rejected NSSAI IE, or both an Allowed NSSAI IE and a Rejected NSSAI IE in a registration accept message from the network node.

Embodiment 3: The method of any of embodiments 1 to 2, further comprising indicating (700) to the network node (900) that the UE (312) is capable of supporting slice deployments that are not available across the entire RA.

Embodiment 4: The method of any of embodiments 1 to 3, wherein receiving (704) network slice assistance from the network node comprises receiving an indication of which network slices are allowed in each TA of the RA.

Embodiment 5: The method of embodiment 4, wherein the indication of which network slices are allowed in each TA of the RA is received in an Allowed Network Slice Selection Assistance Information, NSSAI, Information Element, IE.

Embodiment 6: The method of any of embodiments 4 to 5, wherein the indication of which network slices are allowed in each TA of the RA is received in an Allowed NSSAI Per TA IE.

Embodiment 7: The method of any of embodiments 4 to 6, further comprising not accessing the first network slice in a second TA when the first network slice is not indicated as being allowed in the second TA.

Embodiment 8: The method of any of embodiments 4 to 6, further comprising accessing the first network slice at a reduced Quality of Service, QoS, in a second TA when the first network slice is not indicated as being allowed in the second TA.

Embodiment 9: The method of any of embodiments 1 to 8, wherein receiving (704) network slice assistance from the network node comprises receiving an indication of which network slices are not allowed in each TA of the RA.

Embodiment 10: The method of embodiment 9, wherein the indication of which network slices are not allowed in each TA of the RA is received in a Rejected Network Slice Selection Assistance Information, NSSAI, Information Element, IE. Embodiment 11: The method of any of embodiments 9 to 10, wherein the indication of which network slices are not allowed in each TA of the RA is received in a Rejected NSSAI Per TA IE.

Embodiment 12: The method of any of embodiments 9 to 11, further comprising not accessing the first network slice in a second TA when the first network slice is indicated as being not allowed in the second TA.

Embodiment 13: The method of any of embodiments 9 to 11, further comprising accessing the first network slice at a reduced Quality of Service, QoS, in a second TA when the first network slice is indicated as being not allowed in the second TA.

Embodiment 14: The method of any of embodiments 1 to 13, wherein receiving (704) network slice assistance from the network node comprises receiving an indication that the first network slice is not available in a current TA.

Embodiment 15: The method of embodiment 14, wherein accessing (706) the first network slice in the first TA comprises: entering the first TA; during registration with the network node (900), requesting (702) network slice assistance; and receiving (704) network slice assistance from the network node indicating that the first network slice is available in the first TA.

Embodiment 16: A User Equipment, UE, (312) configured to communicate with a network node (900), the UE comprising a radio interface and processing circuitry configured to perform the method of any of the previous embodiments.

Group B Embodiments

Embodiment 17: A method performed by a network node (900) for heterogeneous slice deployment in a Registration Area, RA, the method comprising one or more of: receiving (802) a request for network slice assistance from a User Equipment, UE (312); determining (804) that the UE is allowed to access a first network slice in a first Tracking Area, TA, but not in an entire Registration Area, RA; and providing (806) network slice assistance to the UE in accordance with the access to the first network slice in the first TA but not in the entire RA.

Embodiment 18: The method of embodiment 17, wherein: receiving (802) the request for network slice assistance comprises receiving a Requested Network Slice Selection Assistance Information, NSSAI, Information Element, IE, in a registration request message; and providing (806) network slice assistance to the UE (312) comprises including an Allowed NSSAI IE, a Rejected NSSAI IE, or both an Allowed NSSAI IE and a Rejected NSSAI IE in a registration accept message to the UE.

Embodiment 19: The method of any of embodiments 17 to 18, further comprising receiving (800) an indication from the UE (312) that the UE is capable of supporting slice deployments that are not available across the entire RA.

Embodiment 20: The method of any of embodiments 17 to 18, wherein if the network node does not have an indication that the UE is capable of supporting slice deployments that are not available across the entire RA, providing (806) network slice assistance to the UE comprises indicating the UE is not allowed to access the first network slice in the RA.

Embodiment 21: The method of any of embodiments 17 to 20, wherein determining (804) that the UE is allowed to access the first network slice in the first TA but not the entire RA comprises: determining that an area covered by the first network slice is less than the entire RA; and configuring the first TA to match the area covered by the first network slice.

Embodiment 22: The method of any of embodiments 17 to 21, wherein providing (806) network slice assistance to the UE comprises providing an indication of which network slices are allowed in each TA of the RA.

Embodiment 23: The method of embodiment 22, wherein the indication of which network slices are allowed in each TA of the RA is provided in an Allowed Network Slice Selection Assistance Information, NSSAI, Information Element, IE.

Embodiment 24: The method of any of embodiments 22 to 23, wherein the indication of which network slices are allowed in each TA of the RA is provided in an Allowed NSSAI Per TA IE.

Embodiment 25: The method of any of embodiments 22 to 23, wherein the UE is not allowed access to the first network slice in a second TA when the first network slice is not indicated as being allowed in the second TA.

Embodiment 26: The method of any of embodiments 22 to 23, wherein the UE is allowed access to the first network slice at a reduced Quality of Service, QoS, in a second TA when the first network slice is not indicated as being allowed in the second TA.

Embodiment 27: The method of any of embodiments 17 to 26, wherein providing (806) network slice assistance to the UE comprises providing an indication of which network slices are not allowed in each TA of the RA.

Embodiment 28: The method of embodiment 27, wherein the indication of which network slices are not allowed in each TA of the RA is provided in a Rejected Network Slice Selection Assistance Information, NSSAI, Information Element, IE.

Embodiment 29: The method of any of embodiments 27 to 28, wherein the indication of which network slices are not allowed in each TA of the RA is provided in a Rejected NSSAI Per TA IE.

Embodiment 30: The method of any of embodiments 27 to 29, wherein the UE is not allowed access to the first network slice in a second TA when the first network slice is indicated as being not allowed in the second TA.

Embodiment 31: The method of any of embodiments 27 to 29, wherein the UE is allowed access to the first network slice at a reduced Quality of Service, QoS, in a second TA when the first network slice is indicated as being not allowed in the second TA.

Embodiment 32: The method of any of embodiments 17 to 31, wherein providing (806) network slice assistance to the UE comprises providing an indication that the first network slice is not available in a current TA.

Embodiment 33: The method of embodiment 32, further comprising: receiving (802) another request for network slice assistance when the UE enters the first TA; and providing (806) network slice assistance to the UE indicating that the first network slice is available in the first TA.

Embodiment 34: A network node (900) configured to communicate with a User Equipment, UE, (312) the network node comprising processing circuitry configured to perform the method of any of the previous embodiments.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GMM Fifth Generation Mobility Management
5GS Fifth Generation System
5GSM Fifth Generation Session Management
AF Application Function
AMF Access and Mobility Function
AN Access Network
AP Access Point
ASIC Application Specific Integrated Circuit
AUSF Authentication Server Function
CCNF Common Control Network Functions
CP Control Plane
CPU Central Processing Unit
DCI Downlink Control Information
DN Data Network
DSP Digital Signal Processor
eNB Enhanced or Evolved Node B
FDD Frequency Division Duplexing
FPGA Field Programmable Gate Array
gNB New Radio Base Station
gNB-CU New Radio Base Station Central Unit
gNB-DU New Radio Base Station Distributed Unit
HSS Home Subscriber Server
IE Information Element
IoT Internet of Things
LTE Long Term Evolution
MAC Medium Access Control
MBB Mobile Broadband
MME Mobility Management Entity
MTC Machine Type Communication
NAS Non-Access Stratum
NEF Network Exposure Function
NF Network Function
NG Next Generation
NG-RAN Next Generation Radio Access Network
NR New Radio
NRF Network Function Repository Function
NSSAI Network Slice Selection Assistance Information
NSSF Network Slice Selection Function
OTT Over-the-Top
PC Personal Computer
PCF Policy Control Function
PDSCH Physical Downlink Shared Channel
PDU Packet Data Unit
P-GW Packet Data Network Gateway
PLMN Public Land Mobile Network
Qos Quality of Service
RA Registration Area
RAM Random Access Memory
RAN Radio Access Network
RNL Radio Network Layer
ROM Read Only Memory
RRC Radio Resource Control
RRH Remote Radio Head
RTT Round Trip Time
SCEF Service Capability Exposure Function
SMF Session Management Function
S-NSSAI Single Network Slice Selection Assistance Information
TA Tracking Area
TAI Tracking Area Information
TCI Transmission Configuration Indicator
TDD Time Division Duplexing
TNL Transport Network Layer
TRP Transmission/Reception Point
TS Technical Specification
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a User Equipment (UE) for accessing a network slice, the method comprising:

during registration with a network node, requesting network slice assistance;

receiving the requested network slice assistance from the network node indicating access to a first network slice in a first Tracking Area (TA), but not in an entire Registration Area (RA), where there is a second TA in the RA without access to the first network slice; and accessing the first network slice in the first TA.

2. The method of claim 1, wherein:

the requesting the network slice assistance comprises including a Requested Network Slice Selection Assistance Information (NSSAI) Information Element (IE) in a registration request message; and the receiving the network slice assistance from the network node comprises receiving at least one of an Allowed NSSAI IE and a Rejected NSSAI IE in a registration accept message from the network node.

3. The method of claim 1, further comprising indicating to the network node that the UE is capable of supporting slice deployments that are not available across the entire RA.

4. The method of claim 1, wherein receiving the network slice assistance from the network node comprises receiving an indication of which network slices are allowed in which TA of the RA.

5. The method of claim 4, wherein the indication of which network slices are allowed in which TA of the RA is received in the Allowed NSSAI IE.

6. The method of claim 4, wherein the indication of which network slices are allowed in which TA of the RA is received in an Allowed NSSAI Per TA IE for slices that are not available in all TAs of the RA.

7. The method of claim 4, further comprising not accessing the first network slice in a second TA when the first network slice is not indicated as being allowed in the second TA.

8. The method of claim 1, wherein receiving the network slice assistance from the network node comprises receiving an indication of which network slices are not allowed in which TA of the RA.

9. The method of claim 8, wherein the indication of which network slices are not allowed in which TA of the RA is received in one or more of: a list of one or more TAs in which the network slice is available; and a list of one or more TAs in which the network slice is not available.

10. The method of claim 1, wherein receiving the network slice assistance from the network node comprises receiving an indication that the first network slice is not available in a current TA.

11. The method of claim 10, wherein accessing the first network slice in the first TA comprises:

entering the first TA;

requesting a service provided by the first network slice;

receiving a rejection with a cause value of S-NSSAI not available in current Tracking Area.

12. A User Equipment (UE) configured to communicate with a network node, the UE comprising a radio interface and processing circuitry configured to cause the UE to:

during registration with a network node, request network slice assistance;

receive the requested network slice assistance from the network node indicating access to a first network slice in a first Tracking Area (TA), but not in an entire Registration Area (RA), where there is a second TA in the RA without access to the first network slice; and access the first network slice in the first TA.

13. A method performed by a network node for heterogeneous slice deployment in a Registration Area (RA), the method comprising:

receiving a request for network slice assistance from a User Equipment (UE);

determining that the UE is allowed to access a first network slice in a first Tracking Area (TA), but not in an entire RA, where there is a second TA in the RA without access to the first network slice; and providing the network slice assistance to the UE in accordance with access to the first network slice in the first TA but not in the entire RA.

14. The method of claim 13, wherein:

the receiving the request for the network slice assistance comprises receiving a Requested Network Slice Selection Assistance Information (NSSAI) Information Element (IE) in a registration request message; and the providing the network slice assistance to the UE comprises including at least one of an Allowed NSSAI IE and a Rejected NSSAI IE in a registration accept message to the UE.

15. The method of claim 13, further comprising receiving an indication from the UE that the UE is capable of supporting slice deployments that are not available across the entire RA.

16. The method of claim 13, wherein if the network node does not have an indication that the UE is capable of supporting slice deployments that are not available across the entire RA, providing the network slice assistance to the UE comprises indicating the UE is not allowed to access the first network slice in the RA.

17. The method of claim 13, wherein determining that the UE is allowed to access the first network slice in the first TA but not the entire RA comprises:

determining that an area covered by the first network slice is less than the entire RA; and configuring the first TA to match the area covered by the first network slice.

18. The method of claim 13, wherein providing the network slice assistance to the UE comprises providing an indication of which network slices are allowed in which TA of the RA.

19. The method of claim 18, wherein the indication of which network slices are allowed in which TA of the RA is provided in the Allowed NSSAI IE.

20. The method of claim 18, wherein the indication of which network slices are allowed in which TA of the RA is provided in an Allowed NSSAI Per TA IE for slices that are not available in all TAs of the RA.

21. The method of claim 18, wherein the UE is not allowed access to the first network slice in a second TA when the first network slice is not indicated as being allowed in the second TA.

22. The method of claim 13, wherein providing the network slice assistance to the UE comprises providing an indication of which network slices are not allowed in which TA of the RA.

23. The method of claim 22, wherein the indication of which network slices are not allowed in which TA of the RA is provided in one or more of: a list of one or more TAs in which the network slice is available; and a list of one or more TAs in which the network slice is not available.

24. The method of claim 13, wherein providing the network slice assistance to the UE comprises providing an indication that the first network slice is not available in a current TA.

25. The method of claim 24, further comprising:

receiving, from the UE, a request for a service provided by the first network slice; and providing, to the UE, a rejection with a cause value of S-NSSAI not available in current Tracking Area.

26. A network node configured to communicate with a User Equipment (UE), the network node comprising processing circuitry configured to cause the network node to:

receive a request for network slice assistance from a UE;

determine that the UE is allowed to access a first network slice in a first Tracking Area (TA), but not in an entire Registration Area (RA), where there is a second TA in the RA without access to the first network slice; and provide the network slice assistance to the UE in accordance with access to the first network slice in the first TA but not in the entire RA.

* * * * *